United States Patent
Greiner

(10) Patent No.: US 6,637,941 B2
(45) Date of Patent: Oct. 28, 2003

(54) LINEAR ROLLING BEARING

(75) Inventor: Heinz Greiner, Ebersbach (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/982,427

(22) Filed: Oct. 18, 2001

(65) Prior Publication Data

US 2002/0048417 A1 Apr. 25, 2002

(30) Foreign Application Priority Data

Oct. 19, 2000 (DE) .......................................... 100 51 770

(51) Int. Cl.$^7$ .............................................. F16C 29/06
(52) U.S. Cl. ...................................................... 384/43
(58) Field of Search ............................. 384/43, 44, 46, 384/49, 50, 52, 53, 55, 56

(56) References Cited

U.S. PATENT DOCUMENTS

| | | | |
|---|---|---|---|
| 2,503,009 A | | 4/1950 | Thomson |
| 4,815,862 A | | 3/1989 | Mugglestone et al. ........ 384/43 |
| 5,221,145 A | * | 6/1993 | Borel ........................... 384/43 |
| 5,346,313 A | * | 9/1994 | Ng ................................ 384/43 |
| 5,613,780 A | * | 3/1997 | Ng ................................ 384/43 |
| 5,921,682 A | | 7/1999 | Kitade .......................... 384/43 |

FOREIGN PATENT DOCUMENTS

| | | |
|---|---|---|
| DE | 8029742 | 11/1960 |
| DE | 1889649 | 8/1964 |
| DE | 408548 | 9/1966 |
| DE | 1450060 | 7/1969 |
| DE | 2030076 | 12/1971 |
| DE | 2605603 | 8/1977 |
| DE | 8029743 | 11/1980 |
| DE | 3131321 | 2/1983 |
| DE | 3206126 | 9/1983 |
| EP | 0519488 | 12/1992 |

OTHER PUBLICATIONS

Patent Abstracts of Japan, Sep. 22, 1992, vol. 16, No. 456 (1 pg).
Patent Abstracts of Japan, Feb. 21, 1981, vol. 5, No. 2 (1 pg).

* cited by examiner

Primary Examiner—Thomas R. Hannon
(74) Attorney, Agent, or Firm—Muserlian, Lucas and Mercanti

(57) ABSTRACT

In a linear rolling bearing comprising a shaft (1) acting as a guide rail and having a profiled or round, particularly circular cross-section, an outer peripheral surface of the shaft forming raceways (6) extending in longitudinal direction for rolling elements, for example, balls, cylindrical rollers or convex rollers, the linear rolling bearing further comprising a cup (2) surrounding the shaft (1) and the rolling elements (3), said cup comprising on an inner surface opposing raceways (7) for the rolling elements (3) while being arranged in a reception or a bore (10) of a connecting structure (11), the cup (2) has a divided configuration in longitudinal direction and is composed of a plurality of segments that comprise the opposing raceways (7) and further comprise support surfaces extending parallel to the opposing raceways (7), through which support surfaces, the segments are supported on one another in peripheral direction of the cup (2).

5 Claims, 2 Drawing Sheets

LINEAR ROLLING BEARING

FIELD OF THE INVENTION

The invention concerns a linear rolling bearing comprising a shaft acting as a guide and having a profiled or round, particularly circular cross-section, an outer peripheral surface of the shaft forming raceways extending in longitudinal direction for rolling elements, for example, balls, cylindrical rollers or convex rollers, the linear rolling bearing further comprising a cup surrounding the shaft and the rolling elements, said cup comprising on an inner surface opposing raceways for the rolling elements while being arranged in a reception or a bore of a connecting structure.

The range of use of such linear rolling bearings includes linear guides that have a limited or an unlimited stroke length, flat or round or profiled raceways and in which the reception of the cup, or of a differently configured element that assumes the function of the cup, describes a circle or a plurality of circular paths. In typical uses, the ball cups can have straight or profiled raceways whose normal lines pass through the center, or the ball cups can have straight or profiled raceways whose normal lines form an angle with the enveloping circle about the center. Known uses include closed ring solid ball cups, torque cups as shown, for example, in the document DE 37 36 876 A1, pillar guides for tools and die sets that have a structure similar to pillar guides.

Closed ring ball cups can be made in a simple manner by inner and outer cylindrical grinding. This applies to commonly used dimensions. If cups of large dimensions are required, particularly with large axial lengths, inner cylindrical grinding becomes more difficult and expensive with increasing length. Due to their profiled inner contour, it is only with difficulty that torque cups can be manufactured. They have to be machined with small profiled tools and this can be time-consuming and cost-intensive and results in minimum material removal, high tool wear rates and the concomitant large scatter of tolerances that manifest themselves in profile errors, poor surface quality and inadequate parallelism of the raceways to the longitudinal axis.

OBJECTS OF THE INVENTION

It is an object of the invention to provide a linear rolling bearing that can be made economically to close tolerances and possesses a high degree of raceway parallelism and a good profile compliance.

This and other objects and advantages will become obvious from the following detailed description.

SUMMARY OF THE INVENTION

The invention achieves the above objects by the fact that the cup of the bearing has a divided configuration in longitudinal direction and is composed of a plurality of segments that comprise the opposing raceways and further comprise support surfaces extending parallel to the opposing raceways, through which support surfaces, the segments are supported on one another in peripheral direction of the cup. In this way, bearings hitherto configured with closed rings or with other closed contours, can be replaced with cups divided longitudinally into segments which may be joined or not joined to one another. The segments can comprise flat, round or otherwise profiled raceways. The longitudinal division permits inner machining with tools that are much larger than the inner diameter of a cup. By this, a more economic fabrication, closer tolerances, improved profile compliance and high raceway parallelism are achieved. The longitudinal division makes it possible to use simple guide elements that are mounted on or positioned relative to the segment in question, and the segments can support one another.

A cup having a closed cross-sectional contour, preferably an annular contour, is cut up in longitudinal direction into at least two parts or segments. These comprise one or more raceways on their inner surface and support one another through their end contours. With modern fabrication methods, raceways and support contours can be made with a profiled grinding wheel or with an appropriate tool, for example, a disk milling cutter, the tool profile comprising regions for the machining of raceways and regions for the machining of support surfaces.

The segments are inserted into a round or profiled but closed reception, for example, a bore in a housing, so that they are subjected to an annular pressure that is exerted by the housing. In this way, the radial position of the segments is uniquely defined. In the presence of forces acting towards the center, the segments can be supported through flat stop surfaces.

If transverse forces act on the segments, a tilting takes place about the highest point of the segment back. In this case, one of the stop surfaces has the tendency to move towards the center of the guide, while the other tends to move away from there. By an appropriate profiling of the stop surfaces, the segments can be supported on one another so that they act like a closed ring. Due to the higher precision of the raceways, a more rigid contact is obtained compared to a closed ring so that with an appropriate configuration of the stop surfaces, the drawback that joints exist has only a negligible effect, and an arrangement is obtained that is more rigid on the whole.

The segments can be fixed to one another in longitudinal direction by positively engaging elements, by rings e.g. securing rings, by welded joints or by end caps. In the reception, they can be fixed individually or as a complete unit by usual methods, for example, by securing rings, pins or screws.

Examples of embodiment of the invention will be described more closely below with reference to the appended drawings.

DETAILED DESCRIPTION OF THE DRAWINGS

Figure 1:
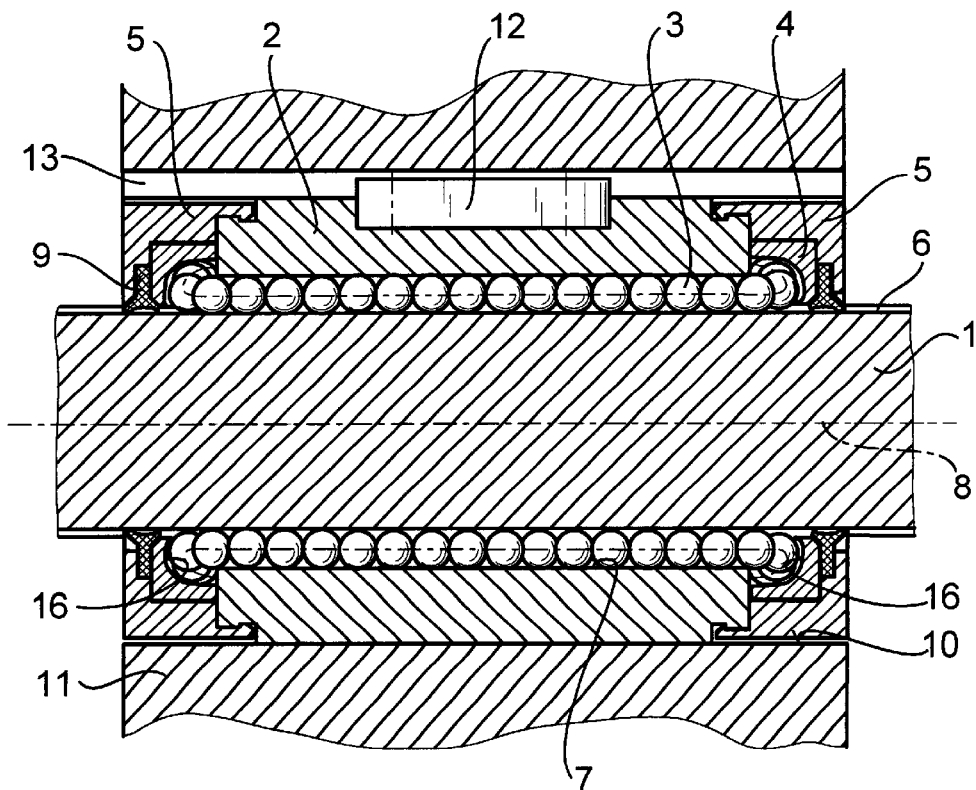
FIG. 1 shows a longitudinal section of a linear bearing configured as a linear ball bearing.

A linear rolling bearing illustrated in FIG. 1 is arranged on a shaft 1 and comprises a cup 2 which surrounds the shaft 1 with a radial gap and comprises a plurality of endless circuits of rolling elements 3 that are guided in a cage 4. The rolling elements 3 are configured in this case as balls. The cup 2 can be composed of several segments that are held together by end rings 5. For load-bearing rolling elements 3 of the rolling element circuits, raceways 6 are formed on the shaft 1 and opposing raceways 7 on the cup 2. The raceways and opposing raceways extend parallel to the longitudinal axis 8 of the shaft 1. Seals 9 arranged in the end rings 5 seal the space of the rolling elements 8 that are supported on the shaft 1 and the cup 2 from the outside. The cup 2 is inserted into a bore 10 of a connecting structure 11 and fixed there in peripheral direction with the help of a feather key 12 that projects into a longitudinal groove 13 of the connecting structure 11.

Figure 2:
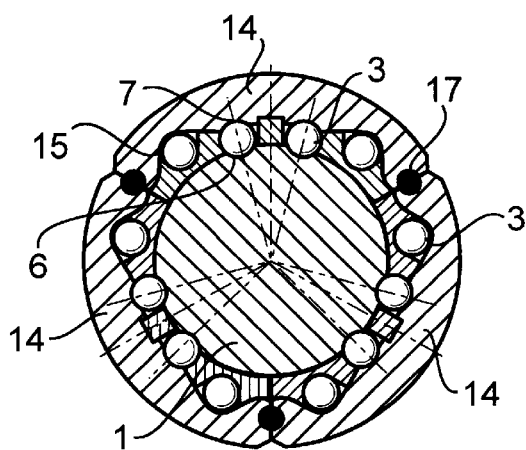
FIG. 2 is a cross-sectional view of a linear ball bearing configured as a linear ball bearing with three segments.

As can be seen in FIG. 2, the cup 2 is made up of three segments 14. Each segment is intended for two rolling element circuits. While the load-bearing rolling elements 3 of each circuit are supported on the respective raceway 6 of the shaft 1 and the respective opposing raceway 7 of the cup 2, return raceways 15 are provided between the shaft 1 and the cup 2 for the returning rolling elements 3. For each circuit of rolling elements 3, the cage 4 comprises two deflecting raceways 16 by which the row of load-bearing rolling elements 3 is connected with the row of rolling elements 3 that are situated in the return raceway 15.

The three segments 14 of the cup 2 are arranged one behind the other in peripheral direction and support one another through support surfaces that extend parallel to the longitudinal axis 8 of the shaft 1. In FIG. 2, the support surfaces have a flat configuration and comprise recesses in which support elements 17 are arranged.

Figure 3:
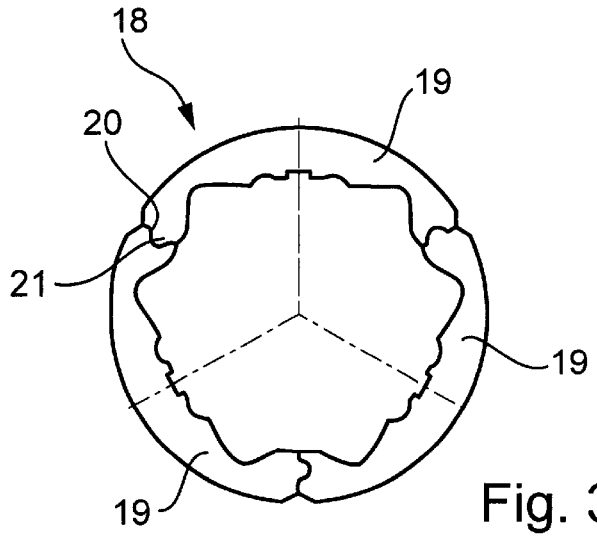
FIG. 3 is an end view of a further linear ball bearing.

FIG. 3 shows a cup 18 with segments 19 that comprise concave recesses 20 and convexities 21 on their support surfaces. From two adjacent segments 19, a convexity 21 of one segment 19 engages into a concave recess 20 of the other segment 19.

Figure 4:
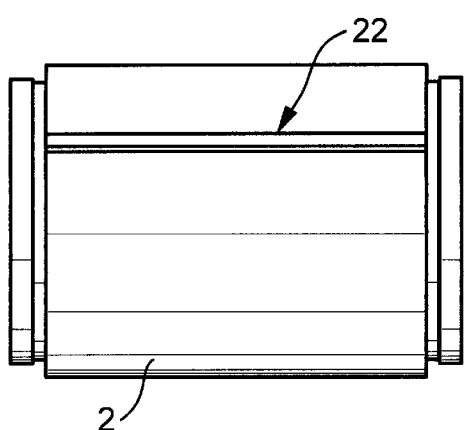
FIG. 4 is a side view of the linear ball bearing of FIG. 2 with segments joined to one another by welding.
Figure 5:
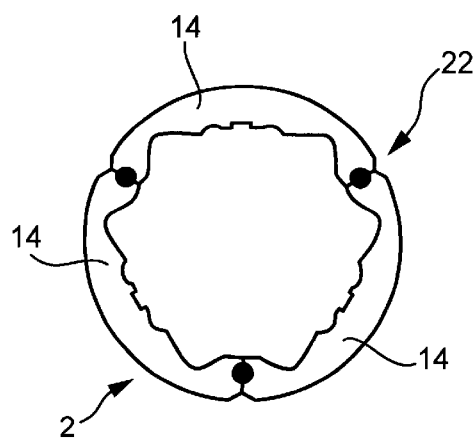
FIG. 5 is an end view of the linear ball bearing of FIG. 4.

According to FIGS. 4 and 5, the segments 14 of the cup 2 are welded to one another in the region of their support surfaces so that weld zones 22 are formed in this region.

Figure 6:
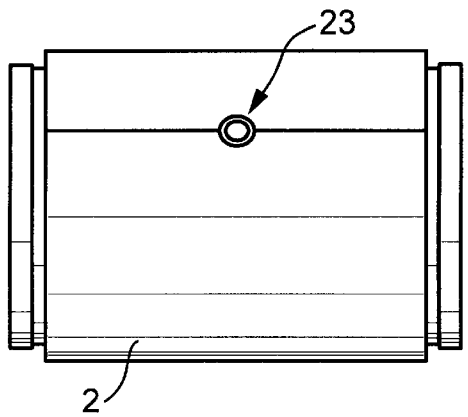
FIG. 6 is a side view of a linear ball bearing with segments fixed to one another by stamping.
Figure 7:
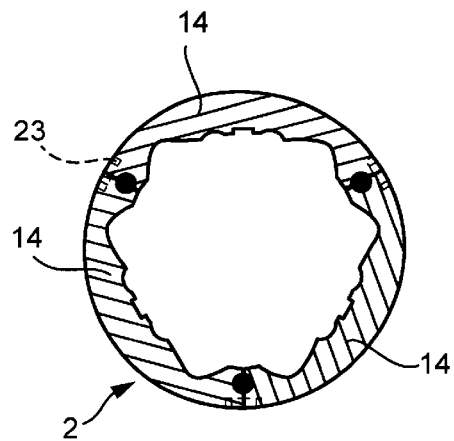
FIG. 7 is a cross-section of the linear ball bearing of FIG. 6.

Instead of welding the segments 14 to one another, they can also be joined by stamping as shown in FIGS. 6 and 7, so that stamped zones 23 are formed on the cup 2 in the region of the support surfaces of the segments 14. However, it is also possible to neither weld nor stamp the segments 14 to one another but to hold them together with the help of end rings 5.

Figure 8:
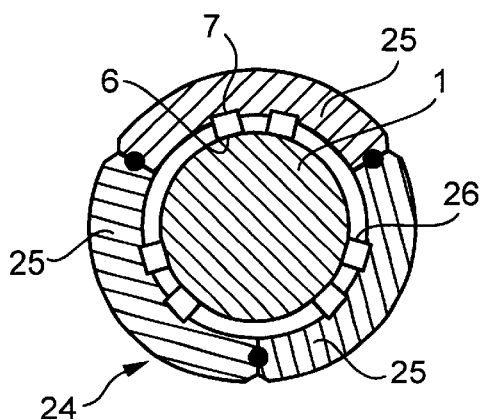
FIG. 8 is a cross-section of a linear rolling bearing with flat raceways for rolling elements configured as cylindrical rollers.
Figure 9:
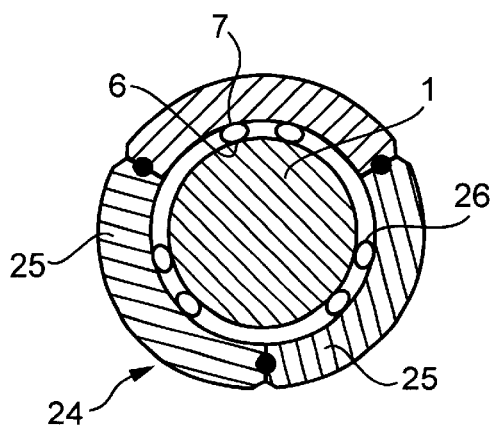
FIG. 9 is a cross-section of a linear rolling bearing with profiled raceways for rolling elements configured as convex rollers.

In FIG. 8, rolling elements 26 in the form of cylindrical rollers are arranged between the shaft 1 and the surrounding cup 24 that is formed by three segments 25. The raceways 6 of the shaft 1 and the opposing raceways 7 of the cup 24 are therefore flat. Correspondingly, in FIG. 9 where convex rollers are used as rolling elements 27, the raceways 6 of the shaft 1 and the opposing raceways 7 of the cup 24 are profiled raceways.

What is claimed is:

1. A linear rolling bearing comprising a shaft acting as a guide rail and having a profiled or round, circular cross-section, an outer peripheral surface of the shaft forming raceways extending in longitudinal direction for rolling elements chosen from the group consisting of balls, cylindrical rollers and convex rollers, the linear rolling bearing further comprising a cup surrounding the shaft and the rolling elements, said cup comprising on an inner surface opposing raceways for the rolling elements while being arranged in a reception or a bore of a connecting structure, wherein the cup has a divided configuration in longitudinal direction and is composed of a plurality of segments that comprise the opposing raceways and further comprise support surfaces extending parallel to the opposing raceways, through which support surfaces, the segments are supported on one another in peripheral direction of the cup, wherein the cup is cut up in longitudinal direction into at least two parts or segments, the support contours thereof are made with a profiled tool, the tool profile thereof comprising regions for the machining of the support surfaces and wherein, from every two adjacent segments, one comprises a support surface having a convexity and the other comprises a support surface having a concave recess.

2. A linear rolling bearing of claim 1, wherein the rolling elements are balls and the raceways of the shaft of the opposing raceways of the segments have circular arc-shaped cross-sections.

3. A linear rolling bearing of claim 1, wherein at least one of the raceways of the shaft and the opposing raceways of the segments are configured as flat surfaces.

4. A linear rolling bearing of claim 1, wherein the support surfaces of the segments are configured as flat surfaces.

5. A linear rolling bearing comprising a shaft acting as a guide rail and having profiled or round circular cross-section, an outer peripheral surface of the shaft forming raceways extending in longitudinal direction for rolling elements chosen from the group consisting of balls, cylindrical rollers and convex rollers, the linear rolling bearing further comprising a cup surrounding the shaft and the rolling elements, said cup comprising on an inner surface opposing raceways for the rolling elements while being arranged in a reception or a bore of a connecting structure, wherein the cup has a divided configuration in longitudinal direction and is composed of a plurality of segments that comprise the opposing raceways and further comprise support surfaces extending parallel to the opposing raceways, through which support surfaces, the segments are supported on one another in peripheral direction of the cup, wherein the cup is cut up in longitudinal direction into at least two parts or segments, the support contours thereof are made with a profiled tool, the tool profile thereof comprising regions for the machining of the support surfaces and wherein every two adjacent segments comprise support surfaces having concave recesses which form a hollow space in which a support element is arranged.

\* \* \* \* \*